(12) United States Patent
Matsuyama et al.

(10) Patent No.: US 10,240,535 B2
(45) Date of Patent: Mar. 26, 2019

(54) GAS TURBINE SILENCER, AND GAS TURBINE PROVIDED WITH SAME

(71) Applicant: MITSUBISHI HEAVY INDUSTRIES, LTD., Tokyo (JP)

(72) Inventors: Keisuke Matsuyama, Tokyo (JP); Tomonori Toda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 436 days.

(21) Appl. No.: 14/771,357

(22) PCT Filed: Feb. 10, 2014

(86) PCT No.: PCT/JP2014/053036
§ 371 (c)(1),
(2) Date: Aug. 28, 2015

(87) PCT Pub. No.: WO2014/141791
PCT Pub. Date: Sep. 18, 2014

(65) Prior Publication Data
US 2016/0010557 A1  Jan. 14, 2016

(30) Foreign Application Priority Data
Mar. 15, 2013 (JP) .................................. 2013-053693

(51) Int. Cl.
*F02C 7/045* (2006.01)
*F02C 7/24* (2006.01)
(Continued)

(52) U.S. Cl.
CPC ................ *F02C 7/24* (2013.01); *F01D 25/30* (2013.01); *F02C 3/04* (2013.01); *F02C 7/045* (2013.01);
(Continued)

(58) Field of Classification Search
CPC . B64D 2033/0206; F01D 25/00; F01D 25/30; F01N 13/007; F02C 7/04;
(Continued)

(56) References Cited

U.S. PATENT DOCUMENTS 6,260,658 B1   7/2001   Darrell et al.
7,100,356 B2   9/2006   Han et al.
(Continued)

FOREIGN PATENT DOCUMENTS

CN   2622404     6/2004
CN   101802367   8/2010
(Continued)

OTHER PUBLICATIONS

English translation of JP 60-066811.*
(Continued)

*Primary Examiner* — Scott J Walthour
(74) *Attorney, Agent, or Firm* — Wenderoth, Lind & Ponack, L.L.P.

(57) ABSTRACT

A gas turbine and a gas turbine silencer are provided. A silencer panel has a structure that can be divided into an upstream silencer panel and a downstream silencer panel in an airflow direction, a stepped part is defined in an opening-side portion of the downstream silencer panel, and the upstream silencer panel and the downstream silencer panel are linked by the stepped part fitting into an opening in the upstream silencer panel.

9 Claims, 13 Drawing Sheets

(51) Int. Cl.
*F01D 25/30* (2006.01)
*F02C 3/04* (2006.01)
*B64D 33/02* (2006.01)

(52) U.S. Cl.
CPC .. *B64D 2033/0206* (2013.01); *F05D 2260/96* (2013.01)

(58) Field of Classification Search
CPC F02C 7/045; F02C 7/24; F02M 35/12; F02M 35/1272; F02M 35/1283; F04D 29/663; F04D 29/668; F05B 2260/96; F05D 2260/96
See application file for complete search history.

(56) References Cited

U.S. PATENT DOCUMENTS

| | | | |
|---|---|---|---|
| 7,104,749 | B2 | 9/2006 | Frutschi |
| 8,459,407 | B2 | 6/2013 | Jangili |
| 2010/0077754 | A1* | 4/2010 | Jangili .................. F01D 25/30 60/725 |
| 2011/0268149 | A1* | 11/2011 | Chillar .................. G01J 5/0014 374/124 |

FOREIGN PATENT DOCUMENTS

| | | |
|---|---|---|
| JP | 59-47307 | 3/1984 |
| JP | 60-66811 | 5/1985 |
| JP | 7-224685 | 8/1995 |
| JP | 2003-97292 | 4/2003 |
| JP | 2004-28107 | 1/2004 |
| JP | 3711125 | 8/2005 |

OTHER PUBLICATIONS

Written Opinion of the International Searching Authority dated Mar. 18, 2014 in International (PCT) Application No. PCT/JP2014/053036, with English translation.
First Office Action dated Mar. 31, 2016 in corresponding Chinese Application No. 201480011339.X, with English translation.
Notification of Reason for Refusal dated Aug. 9, 2016 in Japanese Application No. 2013-053693, with English translation.
Decision of a Patent Grant dated Nov. 8, 2016 in corresponding Japanese Application No. 2013-053693, with English translation.
International Search Report dated Mar. 18, 2014 in International (PCT) Application No. PCT/JP2014/053036, with English translation.

* cited by examiner

GAS TURBINE SILENCER, AND GAS TURBINE PROVIDED WITH SAME

TECHNICAL FIELD

The present invention relates to a gas turbine silencer provided on an air-intake side of a compressor of a gas turbine.

BACKGROUND ART

In recent years, gas turbines have increased in efficiency and size, and along with this, the intake of air from outside has increased. Due to the increase in the intake of the air, noise occurring in the air inlet of the gas turbine is a major problem. To reduce this noise, a silencer is attached to the air inlet of the gas turbine; however, the silencer is increased in size as the gas turbine is increased in size, and there is a demand for improvements in the durability of the silencer.

The structure of such a silencer may be configured by aligning a plurality of silencer panels so that plate surfaces thereof are parallel in the airflow direction. In order to reduce the noise resulting from the increased size of the gas turbine, there is a need to expand the length of the silencer panel in the airflow direction. At this time, it is necessary to divide the silencer panel in the airflow direction from the viewpoint of constraints on manufacturing or transport. A gap may occur in the divided silencer panel between an upstream silencer panel and a downstream silencer panel in a duct of the inlet of the gas turbine at the time of assembly. In particular, when the silencer panel is increased in size, the manufacturing precision for the lengths of the upstream silencer panel and the downstream silencer panel in the airflow direction is decreased, and there is a high possibility that the gap will be generated between both panels. When the gap is present between the upstream silencer panel and the downstream silencer panel, vortexes are generated in the airflow by air flowing from the upstream side into the gap, pressure loss occurs, and there is a possibility that secondary noise which is different to the noise accompanying the original airflow will be generated.

Examples of a gas turbine silencer for eliminating the above gap between the upstream silencer panel and the downstream silencer panel include the following. For example, Japanese Unexamined Patent Application Publication No. H07-224685A describes a silencer where an opening end of a gap adjusting cover with a U-shaped cross-section is fitted and fixed in one silencer panel, which is either of an upstream silencer panel and a downstream silencer panel, from a surface facing the other silencer panel. By adopting such a configuration, the gap between the one silencer panel where the gap adjusting cover is fixed and the other silencer panel is reduced to substantially zero due to thermal expansion of the material of the silencer panels caused by heat accompanying the flow of the airflow.

However, in the silencer described in Japanese Unexamined Patent Application Publication No. H07-224685A, variations are also generated in the thermal expansion of the silencer panel material due to variations in the heat generated by the flow of the airflow. For this reason, due to the variations in the thermal expansion of the silencer panel material, there is a possibility that the gap between the one silencer panel where the gap adjusting cover is fixed and the other silencer panel will not be reduced to substantially zero and that the gap will still remain. In such a case, vortexes are generated in the airflow by air flowing from the upstream side into the gap, pressure loss occurs, and secondary noise is generated. On the other hand, due to the thermal expansion of the silencer panel material, there is a possibility that the silencer panels will be deformed or damaged due to excessive contact between the one silencer panel where the gap adjusting cover is fixed and the other silencer panel. Furthermore, a step may be created in the plate surface of the silencer panel by the gap adjusting cover since the gap adjusting cover is fitted and fixed from the opening end with respect to the one silencer panel out of the upstream silencer panel and the downstream silencer panel. Due to this step, there is a possibility that disturbances will occur in the airflow and that secondary noise will be generated.

SUMMARY OF INVENTION

The present invention has been conceived to solve the aforementioned problems and an object of the present invention is to provide a gas turbine silencer suppressing the occurrence of secondary noise by avoiding the formation of gap between an upstream silencer panel and a downstream silencer panel, and a gas turbine provided with this silencer.

Solution to Problem

A gas turbine silencer according to the present invention for solving the problem described above is a gas turbine silencer installed between an air intake port of a gas turbine and a compressor. The gas turbine silencer has a plurality of plate-shaped divided silencer panels aligned at predetermined intervals in a direction orthogonal to a flow direction of a fluid from the air intake port toward the compressor. The divided silencer panels have an upstream silencer panel where a surface having a greatest plate area is arranged in an orientation along the flow of the fluid and which is arranged on an upstream side in the flow direction of the fluid, and a downstream silencer panel arranged on a downstream side of the upstream silencer panel and linked with the upstream silencer panel. One silencer panel out of the upstream silencer panel and the downstream silencer panel is formed with an opening opened to the side facing the other silencer panel, and the other silencer panel is formed with a fitting section fitting into the opening, and the upstream silencer panel and the downstream silencer panel are linked by the fitting section of the other silencer panel fitting into the opening of the one silencer panel.

With this configuration, since a gap is not generated between the upstream silencer panel and the downstream silencer panel, it is possible to prevent the occurrence of pressure loss and the occurrence of secondary noise without generating vortexes in the airflow.

In addition, it is preferable that the divided silencer panels be configured so that surfaces in contact with the fluid of the one silencer panel and the other silencer panel are substantially flush when the one silencer panel and the other silencer panel are linked.

With this configuration, since a step is not created between the side surface of the upstream silencer panel and the side surface of the downstream silencer panel, it is possible to suppress the occurrence of disturbances in the airflow, and it is possible to suppress the occurrence of pressure loss and secondary noise.

In addition, it is preferable that the other silencer panel be configured so that the end surface where the fitting section is formed is closed, and the fitting section has a convex shape with an orientation fitting into the one silencer panel.

With this configuration, it is possible to simplify the structure since it is not necessary to provide an opening in a portion to be fitted in the other silencer panel. For this reason, it is possible to improve the manufacturing precision of the divided silencer panels.

In addition, it is preferable that the one silencer panel be configured so that, with a position at a predetermined length from the end section on the opening side toward an interior set as a reference point, the length of the opening in the alignment direction of the divided silencer panels is gradually increased from the reference point toward the end section on the opening side. It is preferable that the other silencer panel be configured so that, with a position at a predetermined length from the end section on the fitting section side set as a reference point, the fitting section is formed by gradually decreasing the length of the fitting section in the alignment direction toward the end section on the fitting section side.

With this configuration, the manufacturing workability is improved since the fitting section of the other silencer panel is easily assembled with the opening of the one silencer panel. In addition, the muting performance of the gas turbine silencer is improved since an empty space where it is not necessary to fill a sound-absorbing material is reduced.

In addition, it is preferable that the other silencer panel be configured so that the fitting section fits into substantially the entire opening of the one silencer panel.

With this configuration, it is possible to improve the linking strength between the upstream silencer panel and the downstream silencer panel.

In addition, it is preferable that the other silencer panel be configured so that the fitting section fits into a portion of the opening of the one silencer panel.

With this configuration, since it is possible to increase the region where it is possible to fill the sound-absorbing material, it is possible to improve the muting performance of the divided silencers.

In addition, it is preferable that the other silencer panel be configured so that a plurality of the fitting sections is formed therein.

With this configuration, it is possible to sufficiently secure the linking strength between the upstream silencer panel and the downstream silencer panel.

In addition, it is preferable that the divided silencer panels have a hollow box shape therein, a plurality of fine holes be formed in the side surface in contact with the fluid, and a sound-absorbing material be filled in the hollows.

With this configuration, air taken into the divided silencer panels generates a predetermined viscosity effect and the noise accompanying the flow of air is further reduced by the sound-absorbing effect due to the sound-absorbing material.

A gas turbine according to the present invention for solving the problem described above is provided with a compressor configured to compress air taken in from the air intake port, a combustor configured to generate combustion gas by supplying fuel to compressed air compressed by the compressor, and igniting and combusting fuel with compressed air, a turbine section configured to generate rotational force in a rotor using the combustion gas, an exhaust chamber configured to discharge the combustion gas passing through the turbine section to the outside, and the gas turbine silencer described above arranged between the air intake port and the compressor.

With this configuration, it is possible to reduce noise accompanying the flow of air drawn into the compressor or noise accompanying the flow of combustion gas passing through the exhaust chamber.

Advantageous Effect of Invention

According to the present invention, since a gap is not generated between the upstream silencer panel and the downstream silencer panel, vortexes are not generated in the airflow and it is possible to prevent the occurrence of pressure loss and the occurrence of secondary noise.

DESCRIPTION OF EMBODIMENTS

Detailed description will be given below of embodiments according to the present invention based on the drawings. Here, the present invention is not limited by the embodiments, and the constituent elements in the following embodiments include elements easily conceivable to a person skilled in the art, substantially identical elements, and so-called equivalent elements. Furthermore, it is possible to make various omission, substitutions, and changes to the constituent elements within a range not departing from the scope of the following embodiments.

Embodiment 1

Schematic Configuration and Overall Operation of Gas Turbine 1

Figure 1:
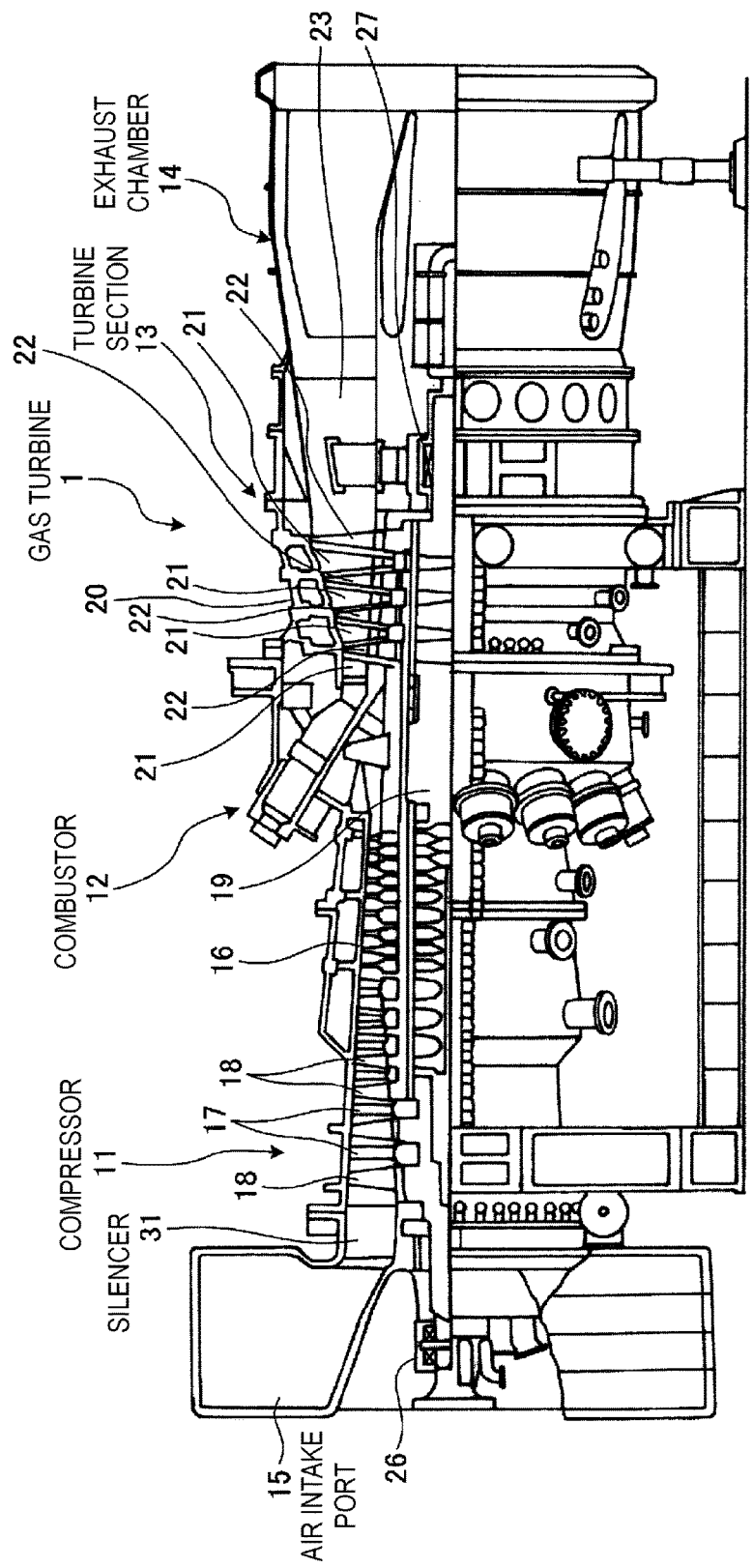
FIG. 1 is a schematic configuration diagram of a gas turbine according to embodiment 1 of the present invention.

FIG. 1 is schematic configuration diagram of a gas turbine according to embodiment 1 of the present invention. With reference to FIG. 1, description will be given of the schematic configuration of a gas turbine 1 according to the present embodiment.

As illustrated in FIG. 1, the gas turbine 1 according to the present embodiment is provided with a compressor 11, a combustor 12, a turbine section 13, and an exhaust chamber 14. In addition, a rotor 19 is arranged so as to pass through a center section of the compressor 11, the combustor 12, the turbine section 13, and the exhaust chamber 14. A driving shaft of a generator (not illustrated) is linked with the end section of the rotor 19 on the exhaust chamber 14 side.

The compressor 11 is provided with an air intake port 15 for taking in outside air, a plurality of vanes 17 and blades 18 alternately arranged in a compressor casing 16, and a silencer 31 installed between the air intake port 15 and the compressor casing 16. The compressor 11 is a mechanism for generating high-temperature and high-pressure compressed air by compressing outside air taken in from the air intake port 15. The vanes 17 are fixed along the circumferential direction of the rotor 19 on the inner wall surface of the compressor casing 16. The blades 18 are fixed in the compressor casing 16 along the circumferential direction of the rotor 19 on the outer periphery of a circular disk formed in the rotor 19.

The combustor 12 is an apparatus generating combustion gas by supplying fuel to compressed air generated by the compressor 11, and igniting and combusting, with a burner, the fuel with compressed air.

The turbine section 13 is provided with a plurality of turbine vanes 21 and turbine blades 22 alternately arranged in the turbine casing 20. The turbine section 13 is a mechanism generating rotational force in the rotor 19 using the combustion gas which is a working fluid generated by the combustor 12. The turbine vanes 21 are fixed along the circumferential direction of the rotor 19 on the inner wall surface of the turbine casing 20. The turbine blades 22 are fixed in the turbine casing 20 along the circumferential direction of the rotor 19 on the outer periphery of a circular disk formed in the rotor 19.

The exhaust chamber 14 has an exhaust diffuser 23 communicating with the turbine casing 20 of the turbine section 13. The exhaust chamber 14 discharges the combustion gas passing through the inside of the turbine casing 20 where the turbine vanes 21 and the turbine blades 22 are alternately arranged, to the outside.

The end section of the rotor 19 on the compressor 11 side is supported by a bearing section 26 to freely rotate and the end section of the rotor 19 on the exhaust chamber 14 side is supported by a bearing section 27 to freely rotate.

Next, description will be given of the overall operation of the gas turbine 1. For the air taken in from the air intake port 15, noise accompanying the flow of air is reduced by the silencer 31, and the air flows into the compressor casing 16 of the compressor 11. The air flowing into the compressor casing 16 becomes compressed air compressed at a high temperature and high pressure by passing through the plurality of alternately arranged vanes 17 and blades 18. The combustor 12 generates high-temperature and high-pressure combustion gas by supplying fuel to the compressed air, and igniting and combusting fuel with the compressed air. By the combustion gas, which is a working fluid, passing through the plurality of the turbine vanes 21 and the turbine blades 22 alternately arranged in the turbine casing 20, the rotor 19 rotates and the generator linked with the rotor 19 is driven to generate power. On the other hand, the combustion gas passing through the inside of the turbine casing 20 is discharged to the outside as exhaust gas after being converted to a static pressure by the exhaust diffuser 23 of the exhaust chamber 14.

Structure of Silencer 31

Figure 2:
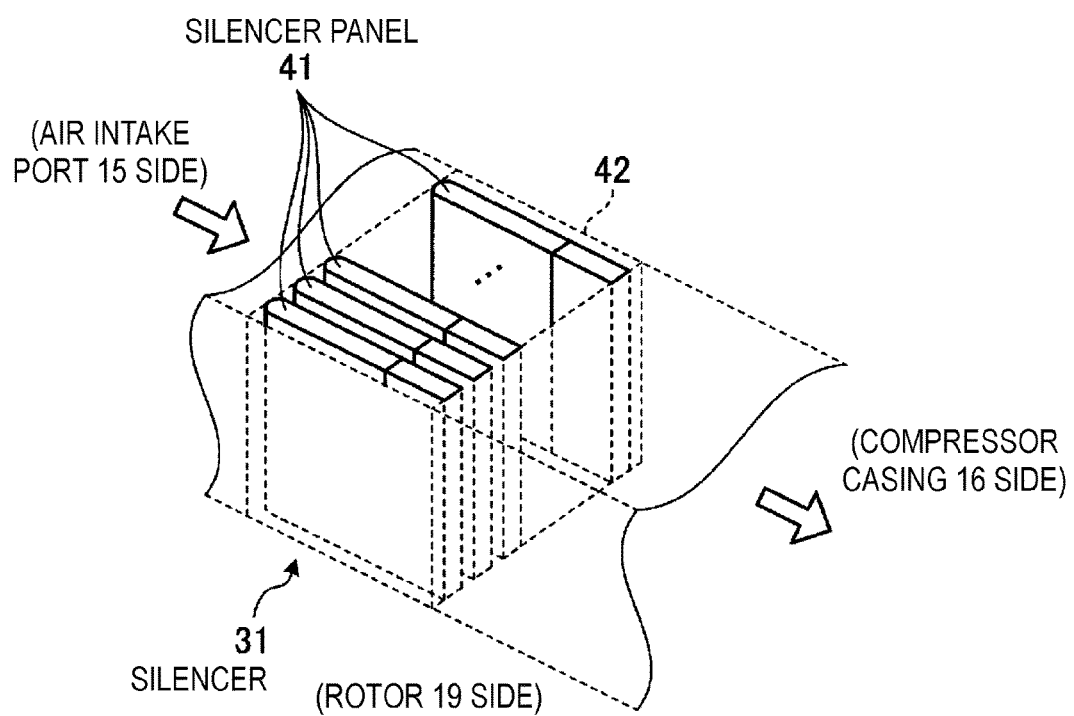
FIG. 2 is an external perspective view of a silencer according to embodiment 1.
Figure 3:
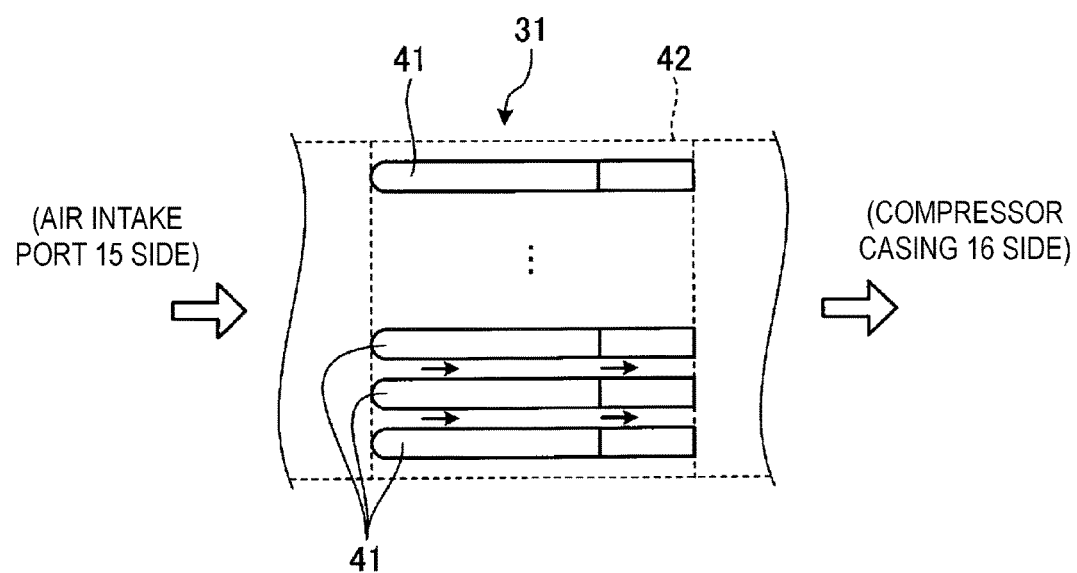
FIG. 3 is a configuration diagram of a radial view of a rotor of the silencer according to embodiment 1.

FIG. 2 is an external perspective view of the silencer according to embodiment 1. FIG. 3 is a configuration diagram of a radial view of the rotor of the silencer according to embodiment 1. With reference to FIG. 2 and FIG. 3, description will be given of the structure of the silencer 31.

In a duct 42 between the air intake port 15 and the compressor casing 16, the silencer 31 is configured so that a plurality of plate-shaped silencer panels (divided silencer panels) 41 has the plate surfaces thereof aligned along the airflow direction from the air intake port 15 toward the compressor casing 16 and at predetermined intervals along the circumferential direction of the rotor 19. FIG. 2 illustrates an extracted portion of the silencer 31 in which a plurality of the silencer panels 41 is aligned in the duct 42, and FIG. 2 and FIG. 3 illustrate a state where the duct 42 portion is removed in the radial view of the rotor 19 in order to illustrate the interior structure of the silencer 31. As illustrated in FIG. 3, the outside air taken in from the air intake port 15 flows toward the compressor casing 16 through the gaps between the silencer panels 41 aligned in the silencer 31.

Figure 4:
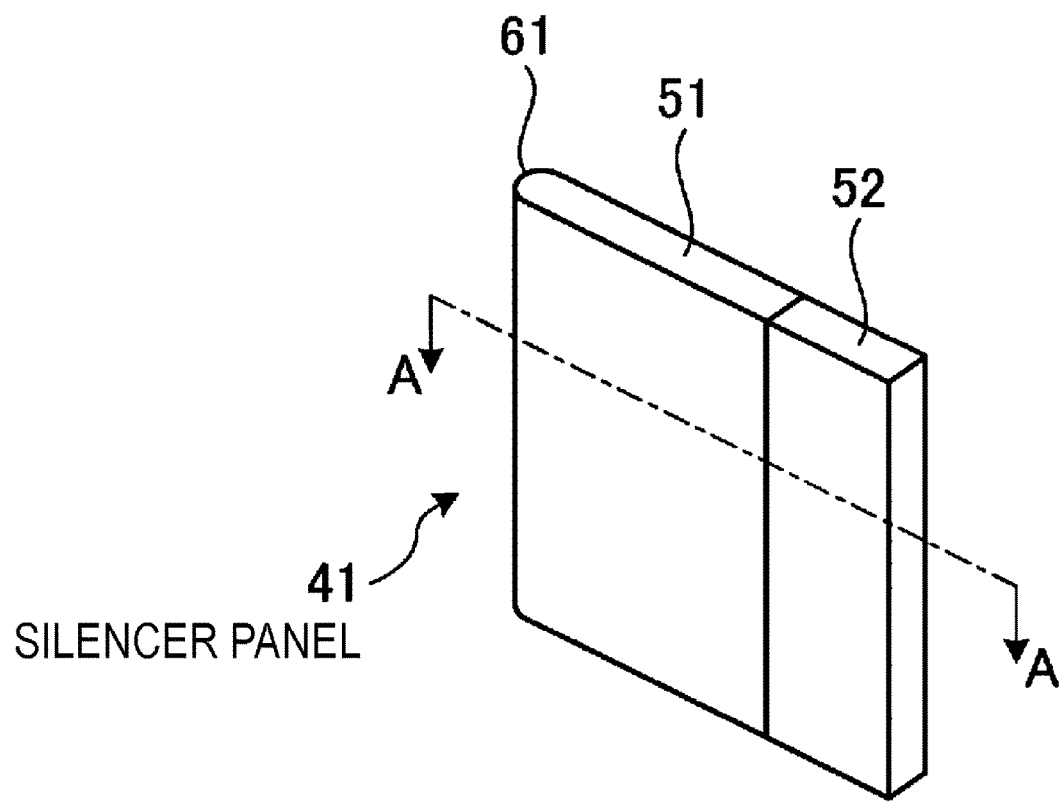
FIG. 4 is an external perspective view of a silencer panel of embodiment 1.
Figure 5:
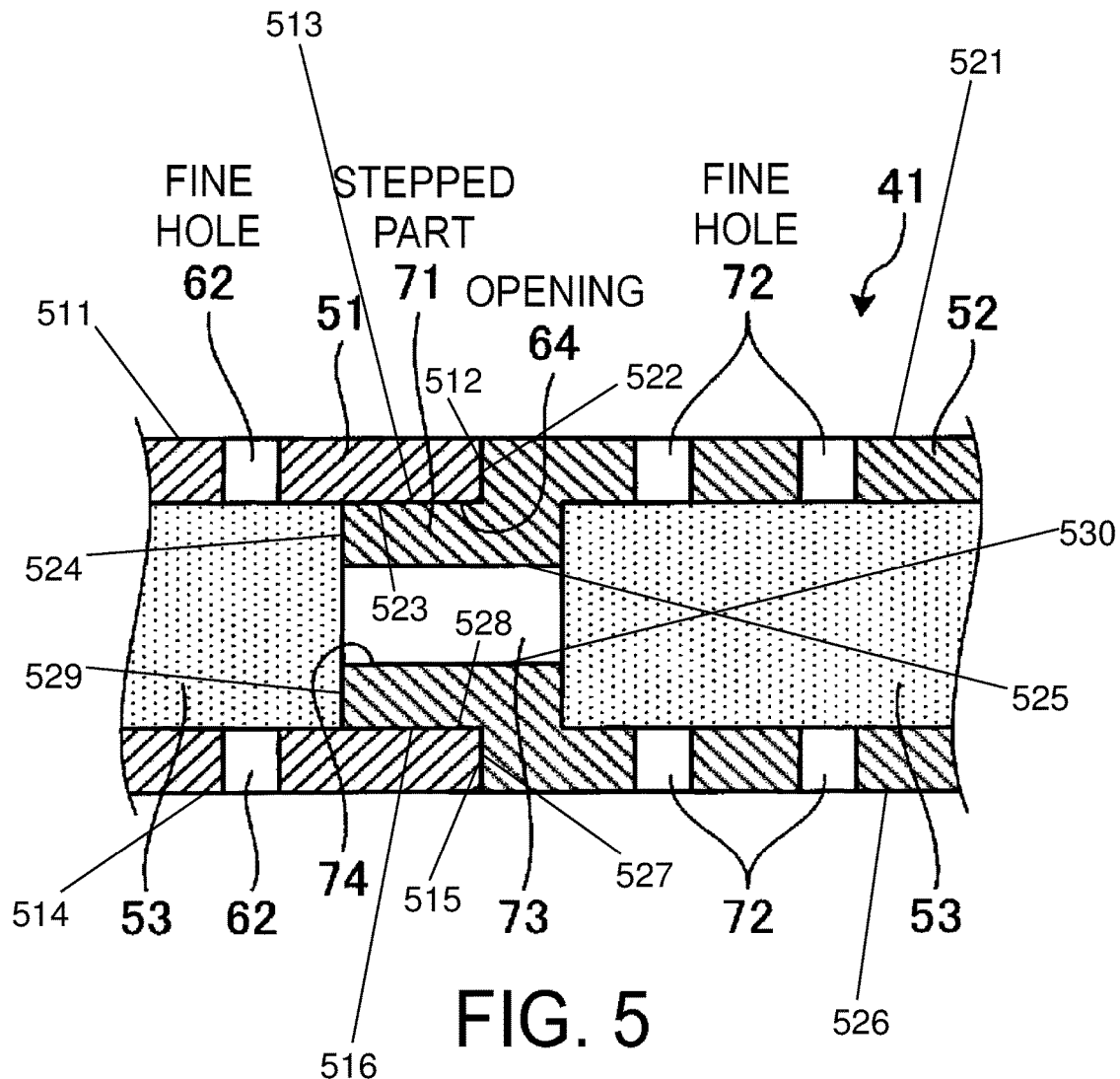
FIG. 5 is a configuration diagram of a fitting portion of the silencer panel along the cross-section A-A in FIG. 4.
Figure 6:
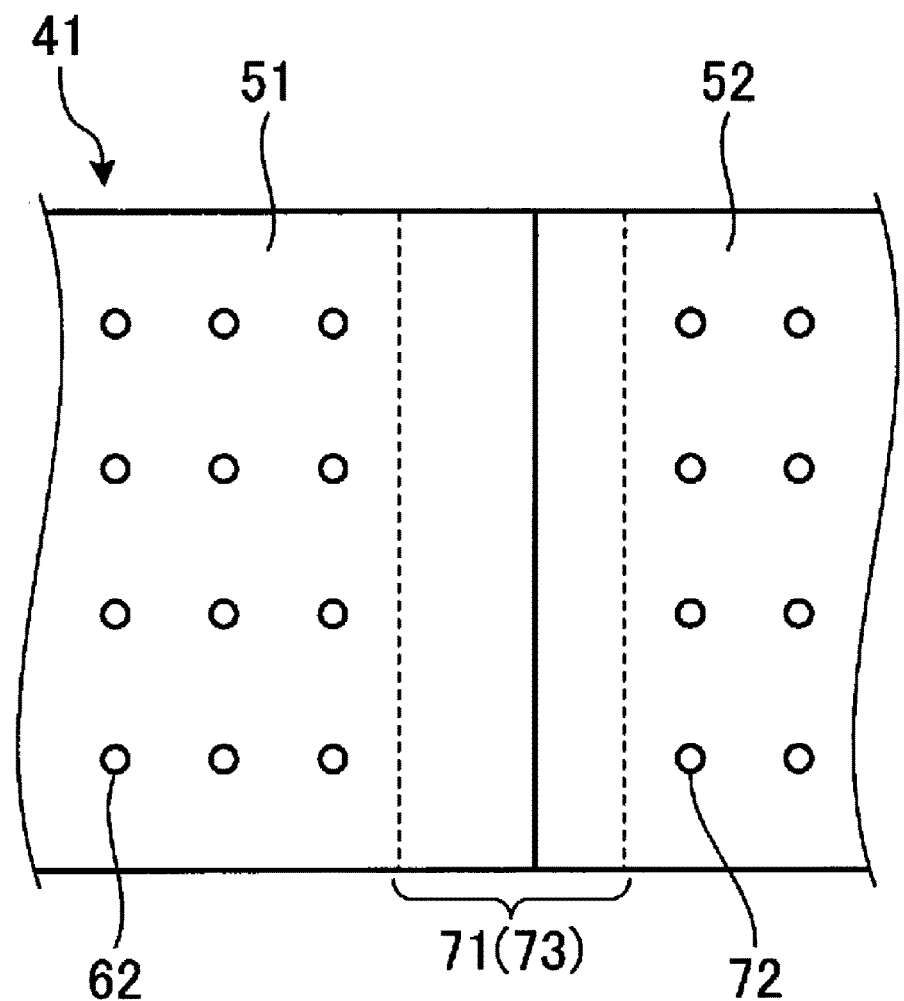
FIG. 6 is a side surface view of main parts of the silencer panel of embodiment 1.

FIG. 4 is an external perspective view of a silencer panel of embodiment 1. FIG. 5 is a configuration diagram of a fitting portion of the silencer panel along the cross-section A-A in FIG. 4. FIG. 6 is a side surface view of main parts of the silencer panel of embodiment 1. With reference to FIG. 4 to FIG. 6, description will be given of the structure of the silencer panel 41 and the fitting structure between the upstream silencer panel 51 and the downstream silencer panel 52.

FIG. 4 illustrates the external appearance of the silencer panel 41 aligned in the duct 42 described above. The silencer panels 41 are panels made of metal having a structure able to be divided in the airflow direction, a portion on the upstream side being set as an upstream silencer panel (silencer panel on the upstream side) 51 and a portion on the downstream side being set as a downstream silencer panel (silencer panel on the downstream side) 52. The upstream silencer panel 51 has a formed box shape having an opening 64 opening on the side fitting with the downstream silencer panel 52, and the interior thereof is hollow as illustrated in FIG. 5. In addition, a bull nose section 61 with a streamlined shape is formed in the upstream silencer panel 51 on a portion on the upstream side of the airflow. By forming the bull nose section 61 on a portion on the upstream side of the upstream silencer panel 51, for the air flowing from the air intake port 15, disturbances in the airflow are reduced, and the air flows into the gaps between the silencer panels 41. The downstream silencer panel 52 has a box shape having an opening 74 opening on the side fitting with the upstream silencer panel 51, and the interior thereof is hollow as illustrated in FIG. 5.

As illustrated in FIG. 5, a sound-absorbing material 53 formed of a porous material having sound-absorbing properties is filled in the respective hollows of the upstream silencer panel 51 and the downstream silencer panel 52. Examples of the porous material include inorganic fiber-based materials such as glass wool, polymeric fiber-based materials such as polyester, and resin foam-based materials such as foamed soft urethane. In addition, as illustrated in FIG. 5 and FIG. 6, a plurality of fine holes 62 is bored in the side surface of the upstream silencer panel 51 along which the air passes. In the same manner, a plurality of fine holes 72 is bored in the side surface of the downstream silencer panel 52 along which the air passes.

In addition, as illustrated in FIG. 5, a stepped part (fitting section) 71 where the length in the alignment direction (hereinafter, referred to simply as the width direction) of the silencer panel 41 is shortened is formed in an opening-side portion of the downstream silencer panel 52. The upstream silencer panel 51 and the downstream silencer panel 52 are linked by the stepped part 71 fitting into substantially the entire opening 64 of the upstream silencer panel 51. Each of the side surfaces of the linked upstream silencer panel 51 and downstream silencer panel 52 is substantially flush. In addition, the respective fine holes 62 and 72 are not bored in the side surface of the portion into which the stepped part 71 is fitted in the upstream silencer panel 51 and in the side surface of the stepped part 71 of the downstream silencer panel 52. This is in order to secure the strength of the fitting structure between the upstream silencer panel 51 and the downstream silencer panel 52. In addition, as illustrated in FIG. 5 and FIG. 6, the sound-absorbing material 53 is not filled in the hollow section corresponding to a side surface portion in which the fine holes 62 and 72 are not bored, that is, in the hollow section 73 corresponding to the stepped part 71 of the downstream silencer panel 52. This is because, even when the sound-absorbing material 53 is filled in the hollow section corresponding to the side surface portion in which fine holes are not bored, it does not contribute to the reduction of noise accompanying the flow of air. As illustrated in FIG. 5, the first silencer panel 51 comprises a first side including: (i) a first longitudinal surface 511 extending parallel to the flow direction of the fluid and being configured to come into contact with the fluid; (ii) a first lateral surface 512 adjoining the first longitudinal surface 511 of the first silencer panel 51 and extending orthogonal to the flow direction of the fluid; and (iii) a second longitudinal surface 513 adjoining the first lateral surface 512 of the first silencer panel 51 and extending parallel to the first longitudinal surface 511 of the first silencer panel 51; and a second side including: (i) a third longitudinal surface 514 extending parallel to the flow direction of the fluid and being configured to come into contact with the fluid; (ii) a second lateral surface 515 adjoining the third longitudinal surface 514 of the first silencer panel 51 and extending orthogonal to the flow direction of the fluid; and (iii) a fourth longitudinal surface 516 adjoining the second lateral surface 515 of the first silencer panel 51 and extending parallel to the third longitudinal surface 514 of the first silencer panel 51; the second silencer panel 52 comprises: a first side including: (i) a first longitudinal surface 521 extending parallel to the flow direction of the fluid and being configured to come into contact with the fluid; (ii) a first lateral surface 522 adjoining the first longitudinal surface 521 of the second silencer panel 52 and extending orthogonal to the flow direction of the fluid; (iii) a second longitudinal surface 523 adjoining the first lateral surface 522 of the second silencer panel 52 and extending in a direction parallel to the first longitudinal surface 521 of the second silencer panel 52; (iv) a second lateral surface 524 adjoining the second longitudinal surface 523 of the second silencer panel 52 and extending orthogonal to the flow direction of the fluid and in a direction parallel to the first lateral surface 522 of the second silencer panel 52; and (v) a third longitudinal surface 525 adjoining the second lateral surface 524 of the second silencer panel 52 and extending parallel to the second longitudinal surface 523 of the second silencer panel 52; and a second side including: (i) a fourth longitudinal surface 526 extending parallel to the flow direction of the fluid and being configured to come into contact with the fluid; (ii) a third lateral surface 527 adjoining the fourth longitudinal surface 526 of the second silencer panel 52 and extending orthogonal to the flow direction of the fluid; (iii) a fifth longitudinal surface 528 adjoining the third lateral surface 527 of the second silencer panel 52 and extending in a direction parallel to the fourth longitudinal surface 526 of the second silencer panel 52; (iv) a fourth lateral surface 529 adjoining the fifth longitudinal surface 528 of the second silencer panel and extending orthogonal to the flow direction of the fluid and in a direction parallel to the third lateral surface 527 of the second silencer panel 52; and (v) a sixth longitudinal surface 530 adjoining the fourth lateral surface 529 of the second silencer panel 52 and extending parallel to the fifth longitudinal surface 528 of the second silencer panel 52; wherein the first lateral surface 522 of the second silencer panel 52, the second longitudinal surface 523 of the second silencer panel 52, the second lateral surface 524 of the second silencer panel 52, the third lateral surface 527 of the second silencer panel 52, the fifth longitudinal surface 528 of the second silencer panel 52, and the fourth lateral surface 529 of the second silencer panel 52 define a stepped part 71 in a fitting side facing the first silencer panel 51; and the first silencer panel 51 and the second silencer panel 52 are linked by the stepped part 71 of the second silencer panel 52 being fitted inside the opening 64 of the first silencer panel 51 such that: (i) the first lateral surface 512 of the first silencer panel 51 abuts the first lateral surface 522 of the second silencer panel 52; (ii) the second longitudinal surface 513 of the first silencer panel 51 abuts the second longitudinal surface 523 of the second silencer panel 52; (iii) the second lateral surface 515 of the first silencer panel 51 abuts the third lateral surface 527 of the second silencer panel 52; (iv) the fourth longitudinal surface 516 of the first silencer panel 51 abuts the fifth longitudinal surface 528 of the second silencer panel 52; and (v) a hollow portion 73 extends orthogonal to the flow direction of the fluid from the third longitudinal surface 525 of the second silencer panel 52 to the sixth longitudinal surface 530 of the second silencer panel 52 so as to connect a central portion of the opening 64 of the first silencer panel 51 with an opening of the second silencer panel 52.

Noise Reducing Effect of Silencer 31

Next, a summary of the effect of reducing noise accompanying the flow of air due to the air passing through the silencer 31 will be given.

The air taken in from the air intake port 15 passes through the gaps between the silencer panels 41 aligned in the circumferential direction of the rotor 19 in the silencer 31. The air passing through the gaps between the silencer panels 41 is taken into the interior of the silencer panel 41 after passing through the fine holes 62 and 72 bored in the side surfaces of the silencer panels 41. The air taken into the interior of the silencer panels 41 generates a viscosity effect according to the width of the hollow in the width direction of the inside of the silencer panel 41, the opening ratio of the fine holes 62 and 72 in the side surface of the silencer panel 41, the plate thickness of the side surface of the silencer panel 41, and the correlation relationship between the hole diameters of the fine holes 62 and 72. Due to the viscosity effect of this air, it is possible to obtain predetermined sound-absorbing characteristics. In addition, for the air taken into the interior of the silencer panel 41, sound is further absorbed by the sound-absorbing material 53 filled in the interior. Due to the effect of the silencer 31 above, noise accompanying the flow of the air is reduced.

As in the configuration of the silencer panel 41 above, the upstream silencer panel 51 and the downstream silencer panel 52 are linked by the stepped part 71 of the downstream silencer panel 52 fitting into substantially the entire opening 64 of the upstream silencer panel 51. With this configuration, since the gap is not generated between the upstream silencer panel 51 and the downstream silencer panel 52, vortexes are not generated in the airflow, and it is possible to prevent the occurrence of pressure loss and the occurrence of secondary noise. In addition, it is possible to improve the linking strength between the upstream silencer panel 51 and the downstream silencer panel 52 since the stepped part 71 fits into substantially the entire opening 64.

In addition, each of the side surfaces of the linked upstream silencer panel 51 and downstream silencer panel 52 is substantially flush. With this configuration, since a step is not created between the side surface of the upstream silencer panel 51 and the side surface of the downstream silencer panel 52, it is possible to suppress the occurrence of disturbances in the airflow, and it is possible to suppress the occurrence of pressure loss and secondary noise.

Here, the shape of the stepped part 71 may be formed at the opening 64 of the upstream silencer panel 51, and the stepped part 71 may be fit into the opening 74 of the downstream silencer panel 52. Even with this configuration, it is possible to obtain the effects described above.

In addition, the silencer panel 41 is able to be divided in the airflow direction as illustrated in FIG. 2, and the divided surfaces are substantially parallel in the radial direction of the rotor 19; however, the present invention is not limited thereto. That is, it is sufficient if the silencer panel 41 is able to be divided in the airflow direction, and it is not necessary for the divided surfaces to be substantially parallel in the radial direction of the rotor 19.

In addition, as illustrated in FIG. 1, the silencer 31 is installed between the air intake port 15 and the compressor 11, that is, on the air-intake side of the compressor 11; however, the present invention is not limited thereto. That is, the silencer 31 may be installed in the exhaust chamber 14 where the combustion gas is taken in after passing through the inside of the turbine casing 20 where the turbine vanes 21 and turbine blades 22 are alternately arranged. With this configuration, it is possible to reduce the noise accompanying the flow of the combustion gas passing through the inside of the exhaust chamber 14.

Embodiment 2

Description will be given of the gas turbine silencer according to embodiment 2 of the present invention focusing on the points which are different to the gas turbine silencer according to embodiment 1. Here, the configuration and operation of the gas turbine provided with the gas turbine silencer according to embodiment 2 are the same as that of the gas turbine 1 according to embodiment 1 illustrated in FIG. 1. In addition, the operation of the effect of reducing the noise accompanying the flow of air due to the air passing through the gas turbine silencer according to embodiment 2 is the same as for the gas turbine silencer according to embodiment 1.

Structure of Silencer 31

In the duct 42 between the air intake port 15 and the compressor casing 16, the silencer 31 (refer to FIG. 1) is configured so that a plurality of plate-shaped silencer panels 41*a* (divided silencer panels) to be described below has the plate surfaces thereof aligned along the airflow direction from the air intake port 15 toward the compressor casing 16 and at predetermined intervals along the circumferential direction of the rotor 19.

Figure 7:
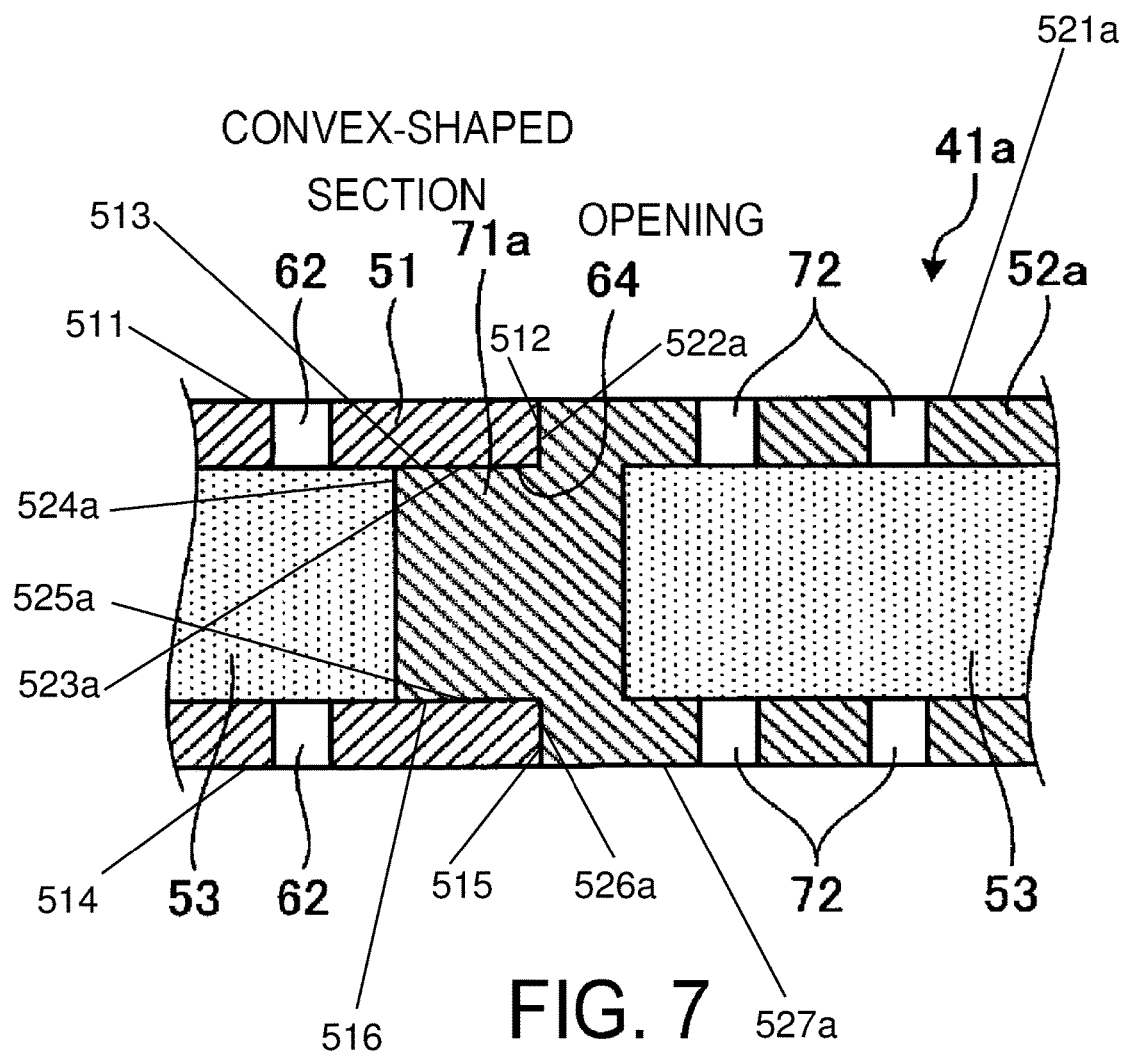
FIG. 7 is a radial direction cross-sectional view (corresponding to the view of the cross-section A-A) of main parts of a rotor of a silencer panel constituting a silencer according to embodiment 2 of the present invention.
Figure 8:
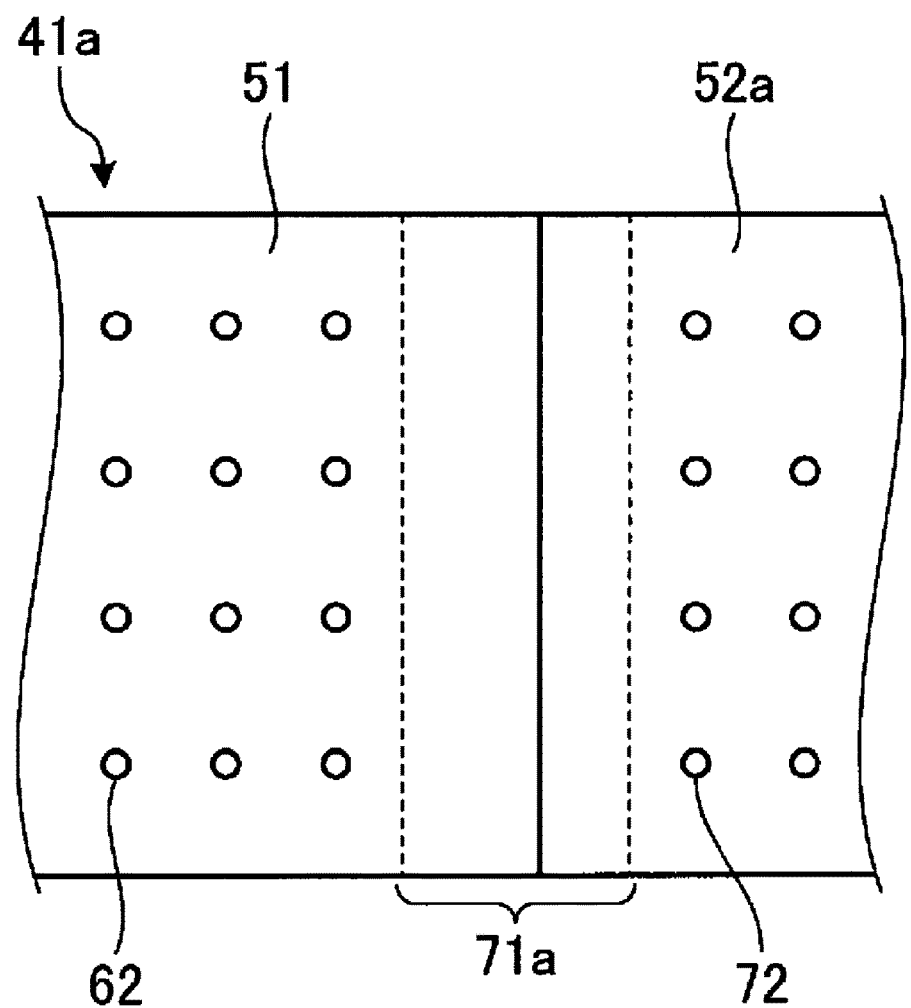
FIG. 8 is a side surface view of main parts of the silencer panel of embodiment 2.

FIG. 7 is a radial direction cross-sectional view (corresponding to the view of the cross-section A-A) of main parts of the rotor of the silencer panel constituting the silencer according to embodiment 2 of the present invention. FIG. 8 is a side surface view of main parts of the silencer panel of embodiment 2. With reference to FIG. 7 and FIG. 8, description will be given of the structure of the silencer panels 41*a* and the fitting structure between the upstream silencer panel 51 and a downstream silencer panel 52*a*.

The silencer panels 41*a* are panels made of metal having a structure able to be divided in the airflow direction, a portion on the upstream side being set as the upstream silencer panel 51, and a portion on the downstream side being set as the downstream silencer panel 52*a*. The upstream silencer panel 51 has a formed box shape having the opening 64 opening on the side fitting with the downstream silencer panel 52*a*, and the interior thereof is hollow as illustrated in FIG. 7. The downstream silencer panel 52*a* has a box shape, and the interior thereof is hollow as illustrated in FIG. 7.

As illustrated in FIG. 7, the sound-absorbing material 53 formed of a porous material having sound-absorbing properties is filled in the respective hollows of the upstream silencer panel 51 and the downstream silencer panel 52*a*. In addition, as illustrated in FIG. 7 and FIG. 8, a plurality of fine holes 62 is bored in the side surface of the upstream silencer panel 51 along which the air passes. In the same manner, a plurality of fine holes 72 is bored in the side surface of the downstream silencer panel 52*a* along which the air passes.

In addition, as illustrated in FIG. 7, a convex-shaped section (a fitting section) 71*a* with a shorter length in the width direction is formed in a portion to be fitted in the downstream silencer panel 52*a*. The upstream silencer panel 51 and the downstream silencer panel 52*a* are linked by the convex-shaped section 71*a* fitting into substantially the entire opening 64 of the upstream silencer panel 51. Each of the side surfaces of the linked upstream silencer panel 51 and downstream silencer panel 52*a* is substantially flush. In addition, the fine holes 62 are not bored in the side surface of the portion into which the convex-shaped section 71*a* is fitted in the upstream silencer panel 51. This is in order to secure the strength of the fitting structure between the upstream silencer panel 51 and the downstream silencer panel 52*a*. As illustrated in FIG. 7, the first silencer panel 51 comprises: a first side including: (i) a first longitudinal surface 511 extending parallel to the flow direction of the fluid and being configured to come into contact with the fluid; (ii) a first lateral surface 512 adjoining the first longitudinal surface 511 of the first silencer panel 51 and extending orthogonal to the flow direction of the fluid; and (iii) a second longitudinal surface 513 adjoining the first lateral surface 512 of the first silencer panel 51 and extending parallel to the first longitudinal surface 511 of the first silencer panel 51; and a second side including: (i) a third longitudinal surface 514 extending parallel to the flow direction of the fluid and being configured to come into contact with the fluid; (ii) a second lateral surface 515 adjoining the third longitudinal surface 514 of the first silencer panel 51 and extending orthogonal to the flow direction of the fluid; and (iii) a fourth longitudinal surface 516 adjoining the second lateral surface 515 of the first silencer panel 51 and extending parallel to the third longitudinal surface 514 of the first silencer panel 51; the second silencer panel 52*a* comprises: (i) a first longitudinal surface 521*a* extending parallel to the flow direction of the fluid and being configured to come into contact with the fluid; (ii) a first lateral surface 522*a* adjoining the first longitudinal surface 521*a* of the second silencer panel 52*a* and extending orthogonal to the flow direction of the fluid; (iii) a second longitudinal surface 523a adjoining the first lateral surface 522a of the second silencer panel 52a and extending in a direction parallel to the first longitudinal surface 521a of the second silencer panel 52a; (iv) a second lateral surface 524a adjoining the second longitudinal surface 523a of the second silencer panel 52a and extending orthogonal to the flow direction of the fluid and in a direction parallel to the first lateral surface 522a of the second silencer panel 52a; (v) a third longitudinal surface 525a adjoining the second lateral surface 524a of the second silencer panel 52a and extending parallel to the second longitudinal surface 523a of the second silencer panel 52a; (vi) a third lateral surface 526a adjoining the third longitudinal surface 525a of the second silencer panel 52a and extending orthogonal to the flow direction of the fluid and in a direction parallel to the second lateral surface 524a of the second silencer panel 52a; and (vii) a fourth longitudinal surface 527a adjoining the third lateral surface 526a of the second silencer panel 52a and extending parallel to the flow direction of the fluid and being configured to come into contact with the fluid; wherein the first lateral surface 522a of the second silencer panel 52a, the second longitudinal surface 523a of the second silencer panel 52a, the second lateral surface 524a of the second silencer panel 52a, the third longitudinal surface 525a of the second silencer panel 52a, and the third lateral surface 526a of the second silencer panel 52a define a stepped part 71a in a fitting side facing the first silencer panel 51; and the first silencer panel 51 and the second silencer panel 52a are linked by the stepped part 71a of the second silencer panel 52a being fitted inside the opening 64 of the first silencer panel 51 such that: (i) the first lateral surface 512 of the first silencer panel 51 abuts the first lateral surface 522a of the second silencer panel 52a; (ii) the second longitudinal surface 513 of the first silencer panel 51 abuts the second longitudinal surface 523a of the second silencer panel 52a; (iii) the second lateral surface 515 of the first silencer panel 51 abuts the third lateral surface 526a of the second silencer panel 52a; (iv) the fourth longitudinal surface 516 of the first silencer panel 51 abuts the third longitudinal surface 525a of the second silencer panel 52; and (v) the second lateral surface 524a of the second silencer panel 52a extends orthogonal to the flow direction of the fluid from the second longitudinal surface 513 of the first silencer panel 51 to the fourth longitudinal surface 516 of the first silencer panel 51 such that the stepped part 71a fits into an entirety of the opening 64 of the first silencer panel 51.

It is possible to simplify the structure with the configuration of the silencer panel 41a above, since, in addition to having the same effect as that of the silencer 31 according to embodiment 1, it is not necessary to provide an opening in the portion to be fitted in the downstream silencer panel 52a, unlike in the downstream silencer panel 52 of embodiment 1. For this reason, it is possible to improve the manufacturing precision of the silencer panel 41a.

Embodiment 3

Description will be given of the gas turbine silencer according to embodiment 3 of the present invention focusing on the points which are different to the gas turbine silencer according to embodiment 1. Here, the configuration and operation of the gas turbine provided with the gas turbine silencer according to embodiment 3 are the same as that of the gas turbine 1 according to embodiment 1 illustrated in FIG. 1. In addition, the operation of the effect of reducing the noise accompanying the flow of air due to the air passing through the gas turbine silencer according to embodiment 3 is the same as for the gas turbine silencer according to embodiment 1.

Structure of Silencer 31

In the duct 42 between the air intake port 15 and the compressor casing 16, the silencer 31 (refer to FIG. 1) is configured so that a plurality of plate-shaped silencer panels 41b (divided silencer panels) to be described below has the plate surfaces thereof aligned along the airflow direction from the air intake port 15 toward the compressor casing 16 and at predetermined intervals along the circumferential direction of the rotor 19.

Figure 9:
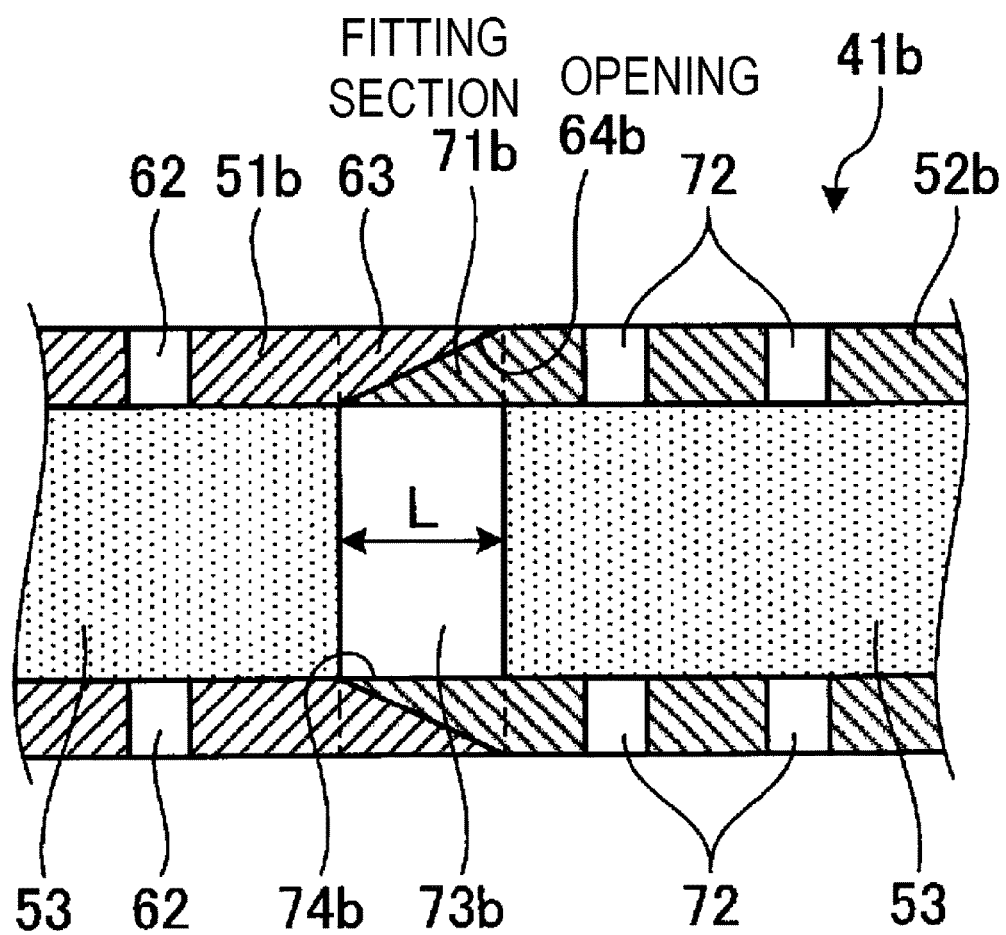
FIG. 9 is a radial direction cross-sectional view (corresponding to the view of the cross-section A-A) of main parts of a rotor of a silencer panel constituting a silencer according to embodiment 3 of the present invention.
Figure 10:
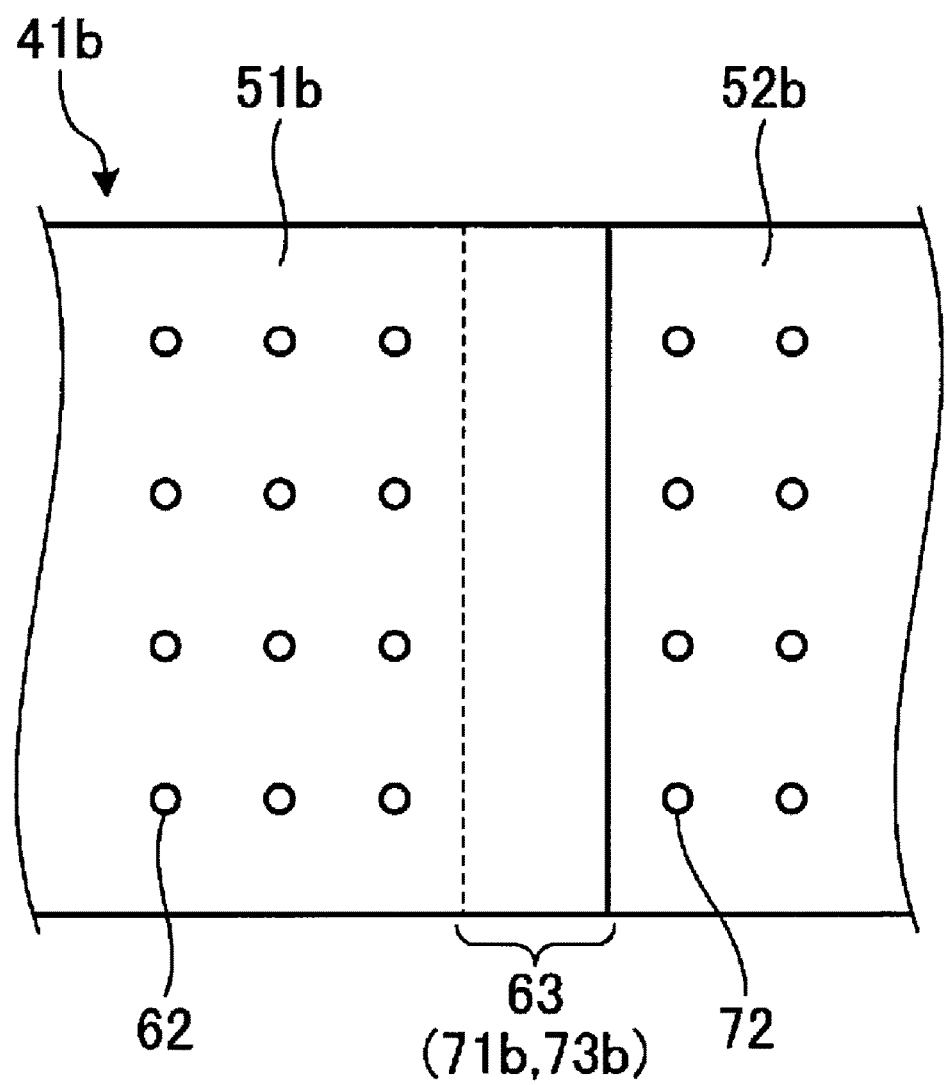
FIG. 10 is a side surface view of main parts of the silencer panel of embodiment 3.

FIG. 9 is a radial direction cross-sectional view (corresponding to the view of the cross-section A-A) of main parts of a rotor of a silencer panel constituting the silencer according to embodiment 3 of the present invention. FIG. 10 is a side surface view of main parts of the silencer panel of embodiment 3. With reference to FIG. 9 and FIG. 10, description will be given of the structure of the silencer panels 41b and the fitting structure between an upstream silencer panel 51b and a downstream silencer panel 52b.

The silencer panels 41b are panels made of metal having a structure able to be divided in the airflow direction, a portion on the upstream side being set as an upstream silencer panel 51b, and a portion on the downstream side being set as a downstream silencer panel 52b. The upstream silencer panel 51b has a formed box shape having an opening 64b opening on the side fitting with the downstream silencer panel 52b, and the interior thereof is hollow as illustrated in FIG. 9. The downstream silencer panel 52b has a box shape having an opening 74b opening on the side fitting with the upstream silencer panel 51b, and the interior thereof is hollow as illustrated in FIG. 9.

As illustrated in FIG. 9, the sound-absorbing material 53 formed of a porous material having sound-absorbing properties is filled in the respective hollows of the upstream silencer panel 51b and the downstream silencer panel 52b. In addition, as illustrated in FIG. 9 and FIG. 10, a plurality of fine holes 62 is bored in the side surface of the upstream silencer panel 51b along which the air passes. In the same manner, a plurality of fine holes 72 is bored in the side surface of the downstream silencer panel 52b along which the air passes.

In addition, as illustrated in FIG. 9, a fitting section 63 is formed in an opening-side portion of the upstream silencer panel 51b so that the length of the hollow in the width direction is gradually increased toward the end section of the opening 64b from a position at a predetermined length L from the end section of the opening 64b toward the interior. In addition, a fitting section 71b is formed in an opening-side portion of the downstream silencer panel 52b so that the length in the width direction between both side surfaces of the downstream silencer panel 52b is gradually decreased toward the end section of the opening 74b from a position at the length L from the end section of the opening 74b toward the interior. The upstream silencer panel 51b and the downstream silencer panel 52b are linked by the fitting section 71b fitting into substantially the entire opening 64b where the fitting section 63 is formed. Each of the side surfaces of the linked upstream silencer panel 51b and downstream silencer panel 52b is substantially flush. In addition, the respective fine holes 62 and 72 are not bored in the side surface of the portion where the fitting section 63 is formed in the upstream silencer panel 51b and in the side surface of the portion where the fitting section 71b is formed in the downstream silencer panel 52b. This is in order to secure the strength of the fitting structure between the upstream silencer panel 51b and the downstream silencer panel 52b. In addition, as illustrated in FIG. 9 and FIG. 10, the sound-absorbing material 53 is not filled in the hollow section corresponding to a side surface portion in which the fine holes 62 and 72 are not bored, that is, in the hollow section 73b corresponding to the fitting section 71b with the length L. This is because, even when the sound-absorbing material 53 is filled in the hollow section corresponding to the side surface portion in which fine holes are not bored, it does not contribute to the reduction of noise accompanying the flow of air.

As in the configuration of the silencer panel 41b above, the upstream silencer panel 51b and the downstream silencer panel 52b are linked by the fitting section 71b of the downstream silencer panel 52b fitting into substantially the entire opening 64b where the fitting section 63 is formed. With this configuration, since a gap is not generated between the upstream silencer panel 51b and the downstream silencer panel 52b, vortexes are not generated in the airflow, and it is possible to prevent the occurrence of pressure loss and the occurrence of secondary noise. In addition, it is possible to improve the linking strength between the upstream silencer panel 51b and the downstream silencer panel 52b since the fitting section 71b fits into substantially the entire opening 64b.

In addition, each of the side surfaces of the linked upstream silencer panel 51b and downstream silencer panel 52b is substantially flush. With this configuration, since a step is not created between the side surface of the upstream silencer panel 51b and the side surface of the downstream silencer panel 52b, it is possible to suppress the occurrence of disturbances in the airflow, and it is possible to suppress the occurrence of pressure loss and secondary noise.

In addition, the length in the width direction at the end section of the opening 74b of the downstream silencer panel 52b is shorter than the length in the width direction at the end section of the opening 64b of the upstream silencer panel 51b. Accordingly, the manufacturing workability is improved since the fitting section 71b of the downstream silencer panel 52b is easily assembled with the fitting section 63 of the upstream silencer panel 51b.

Furthermore, the hollow section 73b in which the sound-absorbing material 53 is not filled may be only the length L portion where the fitting section 63 of the upstream silencer panel 51b and the fitting section 71b of the downstream silencer panel 52b are overlapped. Accordingly, the muting performance of the silencer 31 is improved since the empty space where it is not necessary to fill the sound-absorbing material 53 is reduced compared to the silencer panel 41 of embodiment 1.

Here, the shape of the fitting section 71b may be formed at the opening 64b of the upstream silencer panel 51b and the shape of the fitting section 63 may be formed at the opening 74b of the downstream silencer panel 52b. With this configuration, it is possible to obtain the effects described above.

In addition, the opening 74b is formed in the downstream silencer panel 52b on the side fitting with the upstream silencer panel 51b; however, the present invention is not limited thereto. That is, it is sufficient if the fitting section 71b is formed in the downstream silencer panel 52b so that the length between both side surfaces in the width direction is gradually decreased, and it is not necessary for the opening 74b and the hollow section 73b to be formed.

Embodiment 4

Description will be given of the gas turbine silencer according to embodiment 4 of the present invention focusing on the points which are different to the gas turbine silencer according to embodiment 1. Here, the configuration and operation of the gas turbine provided with the gas turbine silencer according to embodiment 4 are the same as that of the gas turbine 1 according to embodiment 1 illustrated in FIG. 1. In addition, the operation of the effect of reducing the noise accompanying the flow of air due to the air passing through the gas turbine silencer according to embodiment 4 is the same as for the gas turbine silencer according to embodiment 1.

Structure of Silencer 31

In the duct 42 between the air intake port 15 and the compressor casing 16, the silencer 31 (refer to FIG. 1) is configured so that a plurality of plate-shaped silencer panels 41c (divided silencer panels) to be described below has the plate surfaces thereof aligned along the airflow direction from the air intake port 15 toward the compressor casing 16 and at predetermined intervals along the circumferential direction of the rotor 19.

Figure 11:
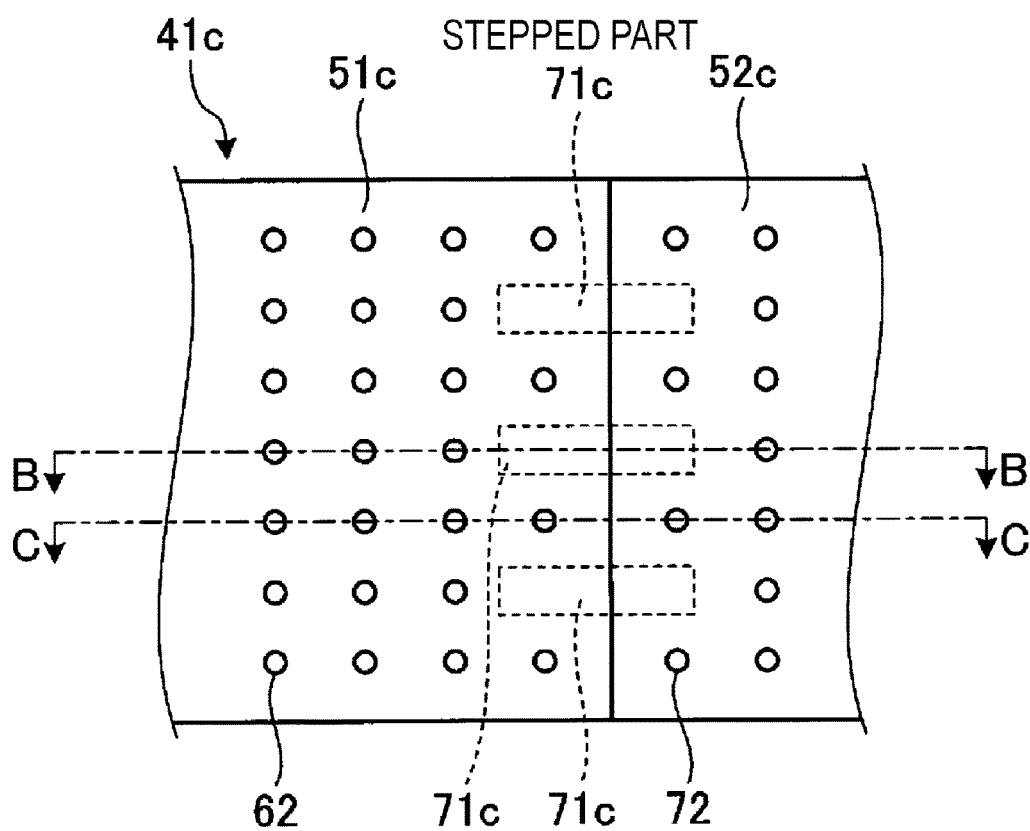
FIG. 11 is a side surface view of main parts of a silencer panel constituting a silencer according to embodiment 4 of the present invention.
Figure 12:
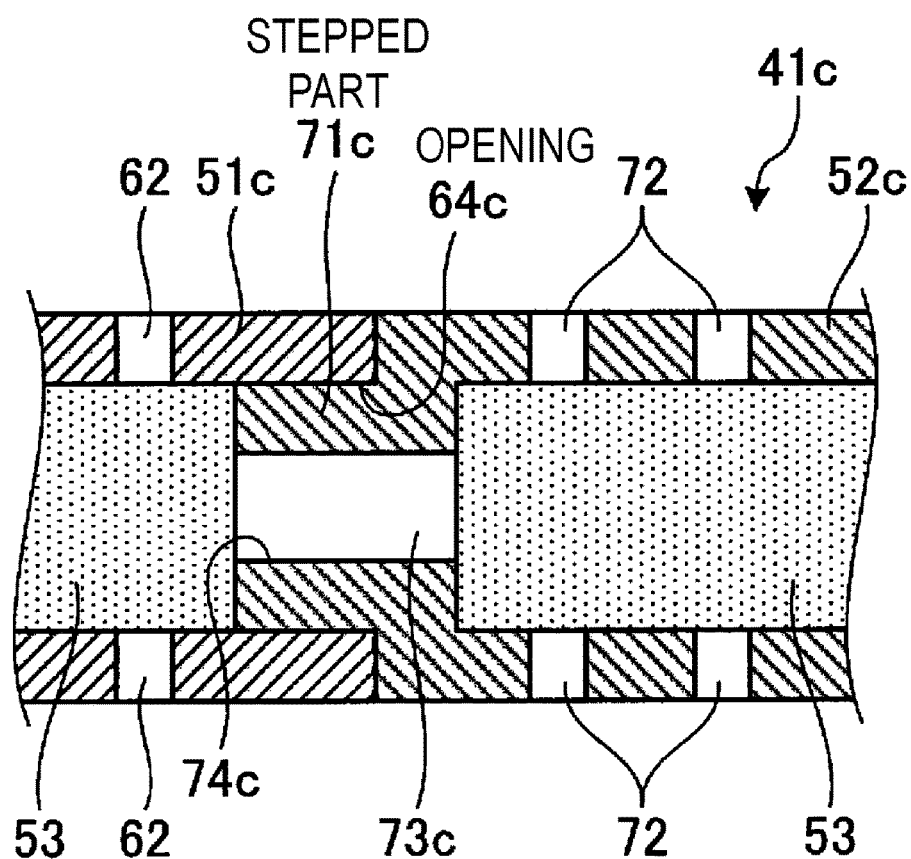
FIG. 12 is a configuration diagram of a fitting portion of the silencer panel along the cross-section B-B in FIG. 11.
Figure 13:
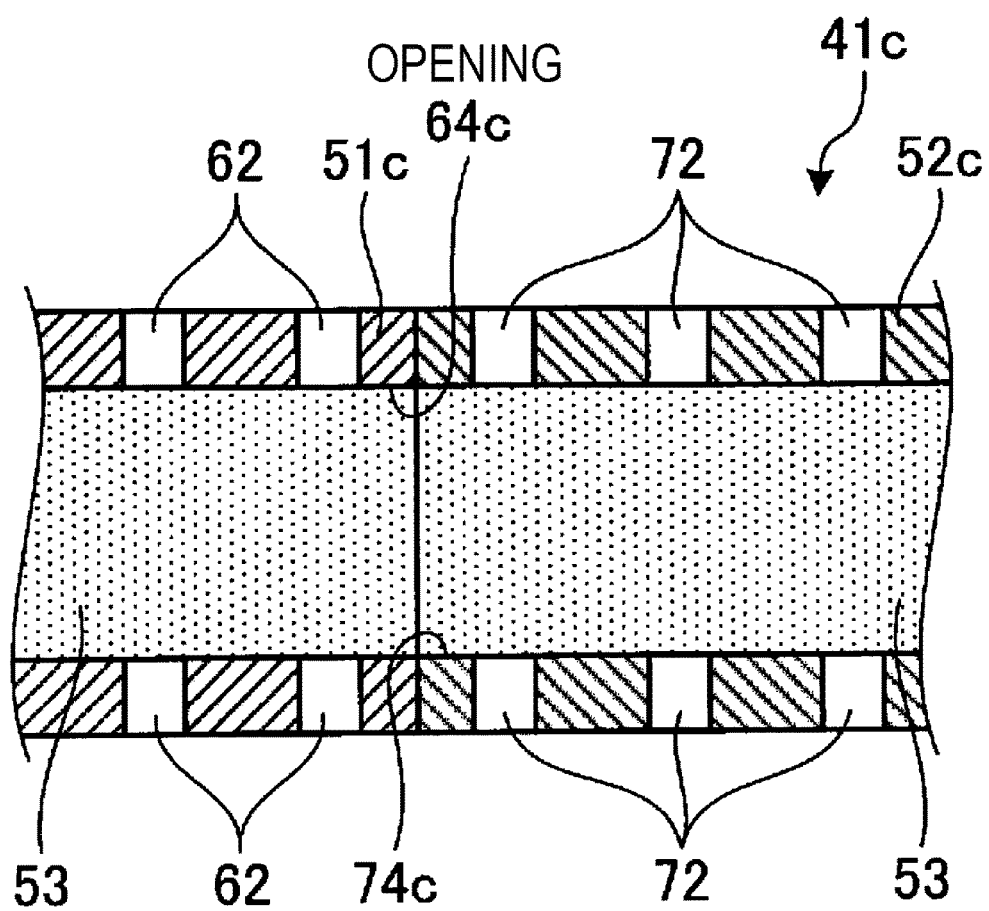
FIG. 13 is a configuration diagram of a contacting portion of the silencer panel along the cross-section C-C in FIG. 11.

FIG. 11 is a side surface view of main parts of a silencer panel constituting the silencer according to embodiment 4 of the present invention. FIG. 12 is a configuration diagram of a fitting portion of the silencer panel along the cross-section B-B in FIG. 11. FIG. 13 is a configuration diagram of a contacting portion of the silencer panel along the cross-section C-C in FIG. 11. With reference to FIG. 11 to FIG. 13, description will be given of the structure of the silencer panels 41c and the fitting structure between an upstream silencer panel 51c and a downstream silencer panel 52c.

The silencer panels 41c are panels made of metal having a structure able to be divided in the airflow direction, a portion on the upstream side being set as the upstream silencer panel 51c, and a portion on the downstream side being set as the downstream silencer panel 52c. The upstream silencer panel 51c has a formed box shape having an opening 64c opening on the side fitting with the downstream silencer panel 52c, and the interior thereof is hollow as illustrated in FIG. 12 and FIG. 13. The downstream silencer panel 52c has a box shape having the opening 74c opening on the side fitting with the upstream silencer panel 51c, and the interior thereof is hollow as illustrated in FIG. 12 and FIG. 13.

As illustrated in FIG. 12 and FIG. 13, the sound-absorbing material 53 formed of a porous material having sound-absorbing properties is filled in the respective hollows of the upstream silencer panel 51c and the downstream silencer panel 52c. In addition, as illustrated in FIG. 11 to FIG. 13, a plurality of fine holes 62 is bored in the side surface of the upstream silencer panel 51c along which the air passes. In the same manner, a plurality of fine holes 72 is bored in the side surface of the downstream silencer panel 52c along which the air passes.

In addition, as illustrated in FIG. 11 and FIG. 12, a stepped part (fitting section) 71c of the silencer panel 41c with a short length in the width direction is formed at three locations in the radial direction of the rotor 19 in an opening-side portion of the downstream silencer panel 52c. The upstream silencer panel 51c and the downstream silencer panel 52c are linked by the three stepped parts 71c fitting into the opening 64c of the upstream silencer panel 51c. Each of the side surfaces of the linked upstream silencer panel 51c and downstream silencer panel 52c is substantially flush. In addition, the fine holes 62 and 72 are not bored in the side surface of the portion into which the stepped part 71c is fitted in the upstream silencer panel 51c and in the side surface of the stepped part 71c of the downstream silencer panel 52c. This is in order to secure the strength of the fitting structure between the upstream silencer panel 51c and the downstream silencer panel 52c. In addition, as illustrated in FIG. 11 and FIG. 12, the sound-absorbing material 53 is not filled in the hollow section corresponding to a side surface portion in which the fine holes 62 and 72 are not bored, that is, in the hollow section 73c corresponding to the three stepped parts 71c of the downstream silencer panel 52c. This is because, even when the sound-absorbing material 53 is filled in the hollow section corresponding to the side surface portion in which fine holes are not bored, it does not contribute to the reduction of noise accompanying the flow of air.

According to the configuration of the silencer panel 41c above, in addition to having the same effect as in the silencer 31 according to embodiment 1, the fitting portion is set only at the three locations of the stepped part 71c formed in the downstream silencer panel 52c. Accordingly, it is possible to improve the muting performance of the silencer 31 since it is possible to increase the region where it is possible to fill the sound-absorbing material 53 in comparison with embodiment 1.

Here, the radial view configuration of the rotor 19 of the stepped part 71c formed in the downstream silencer panel 52c is the same as the configuration of the stepped part 71 of embodiment 1; however, the present invention is not limited thereto. That is, the configuration may be the same as that of the convex-shaped section 71a of embodiment 2, or the configuration may be the same as those of the fitting sections 63 and 71b of embodiment 3.

In addition, the stepped part 71c formed in the downstream silencer panel 52c is set at three locations in the radial direction of the rotor 19; however, the present invention is not limited thereto, and a number of the stepped parts 71c may be formed according to the linking strength to be secured.

REFERENCE SIGNS LIST

1 Gas turbine
11 Compressor
12 Combustor
13 Turbine section
14 Exhaust chamber
15 Air intake port
16 Compressor casing
17 Vane
18 Blade
19 Rotor
20 Turbine casing
21 Turbine vane
22 Turbine blade
23 Exhaust diffuser
26, 27 Bearing section
31 Silencer
41, 41a-41c Silencer panel (divided silencer panel)
42 Duct
51, 51b, 51c Upstream silencer panel (silencer panel on upstream side)
52, 52a-52c Downstream silencer panel (silencer panel on downstream side)
53 Sound-absorbing material
61 Bull nose section
62 Fine hole
63 Fitting section
64, 64b, 64c Opening
71 Stepped part (fitting section)
71a Convex-shaped section (fitting section)
71b Fitting section
71c Stepped part (fitting section)
72 Fine hole
73, 73b, 73c Hollow section
74, 74b, 74c Opening
L Length

The invention claimed is:

1. A gas turbine silencer to be positioned between an air intake port and a compressor of a gas turbine, the gas turbine silencer comprising:
an intake side configured to receive a fluid;
an exhaust side configured to exhaust the fluid; and
a plurality of plate-shaped divided silencer panels aligned at predetermined intervals orthogonal to a flow direction of the fluid between the intake side and the exhaust side;
wherein:
each of the plurality of plate-shaped divided silencer panels comprises an upstream silencer panel and a downstream silencer panel, the upstream silencer panel being positioned on an upstream side, with respect to the flow direction of the fluid, of the downstream silencer panel, and the downstream silencer panel being linked with the upstream silencer panel;
an opening is defined in a first silencer panel, the first silencer panel being one of the upstream silencer panel or the downstream silencer panel, the opening being defined on an opening side of the first silencer panel facing a second silencer panel, the second silencer panel being the other of the upstream silencer panel and the downstream silencer panel;
the first silencer panel comprises:
a first side including: (i) a first longitudinal surface extending parallel to the flow direction of the fluid and being configured to come into contact with the fluid; (ii) a first lateral surface adjoining the first longitudinal surface of the first silencer panel and extending orthogonal to the flow direction of the fluid; and (iii) a second longitudinal surface adjoining the first lateral surface of the first silencer panel and extending parallel to the first longitudinal surface of the first silencer panel; and
a second side including: (i) a third longitudinal surface extending parallel to the flow direction of the fluid and being configured to come into contact with the fluid; (ii) a second lateral surface adjoining the third longitudinal surface of the first silencer panel and extending orthogonal to the flow direction of the fluid; and (iii) a fourth longitudinal surface adjoining the second lateral surface of the first silencer panel and extending parallel to the third longitudinal surface of the first silencer panel;
the second silencer panel comprises:
(i) a first longitudinal surface extending parallel to the flow direction of the fluid and being configured to come into contact with the fluid; (ii) a first lateral surface adjoining the first longitudinal surface of the second silencer panel and extending orthogonal to the flow direction of the fluid; (iii) a second longitudinal surface adjoining the first lateral surface of the second silencer panel and extending parallel to the first longitudinal surface of the second silencer panel; (iv) a second lateral surface adjoining the second longitudinal surface of the second silencer panel and extending orthogonal to the flow direction of the fluid and parallel to the first lateral surface of the second silencer panel; (v) a third longitudinal surface adjoining the second lateral surface of the second silencer panel and extending parallel to the second longitudinal surface of the second silencer panel; (vi) a third lateral surface adjoining the third longitudinal surface of the second silencer panel and extending orthogonal to the flow direction of the fluid and parallel to the second lateral surface of the second silencer panel; and (vii) a fourth longitudinal surface adjoining the third lateral surface of the second silencer panel and extending parallel to the flow direction of the fluid and being configured to come into contact with the fluid;

the first lateral surface of the second silencer panel, the second longitudinal surface of the second silencer panel, the second lateral surface of the second silencer panel, the third longitudinal surface of the second silencer panel, and the third lateral surface of the second silencer panel define a stepped part in a fitting side of the second silencer panel facing the first silencer panel; and the first silencer panel and the second silencer panel are linked by the stepped part of the second silencer panel being fitted inside the opening of the first silencer panel such that: (i) the first lateral surface of the first silencer panel abuts the first lateral surface of the second silencer panel; (ii) the second longitudinal surface of the first silencer panel abuts the second longitudinal surface of the second silencer panel; (iii) the second lateral surface of the first silencer panel abuts the third lateral surface of the second silencer panel; (iv) the fourth longitudinal surface of the first silencer panel abuts the third longitudinal surface of the second silencer panel; and (v) the second lateral surface of the second silencer panel extends orthogonal to the flow direction of the fluid from the second longitudinal surface of the first silencer panel to the fourth longitudinal surface of the first silencer panel such that the stepped part fits into an entirety of the opening of the first silencer panel.

2. A gas turbine silencer to be positioned between an air intake port and a compressor of a gas turbine, the gas turbine silencer comprising:

an intake side configured to receive a fluid;

an exhaust side configured to exhaust the fluid; and a plurality of plate-shaped divided silencer panels aligned at predetermined intervals orthogonal to a flow direction of the fluid between the intake side and the exhaust side;

wherein:

each of the plurality of plate-shaped divided silencer panels comprises an upstream silencer panel and a downstream silencer panel, the upstream silencer panel being positioned on an upstream side, with respect to the flow direction of the fluid, of the downstream silencer panel, and the downstream silencer panel being linked with the upstream silencer panel;

an opening is defined in a first silencer panel, the first silencer panel being one of the upstream silencer panel or the downstream silencer panel, the opening being defined on an opening side of the first silencer panel facing a second silencer panel, the second silencer panel being the other of the upstream silencer panel or the downstream silencer panel;

the first silencer panel comprises:

a first side including: (i) a first longitudinal surface extending parallel to the flow direction of the fluid and being configured to come into contact with the fluid; (ii) a first lateral surface adjoining the first longitudinal surface of the first silencer panel and extending orthogonal to the flow direction of the fluid; and (iii) a second longitudinal surface adjoining the first lateral surface of the first silencer panel and extending parallel to the first longitudinal surface of the first silencer panel; and a second side including: (i) a third longitudinal surface extending parallel to the flow direction of the fluid and being configured to come into contact with the fluid; (ii) a second lateral surface adjoining the third longitudinal surface of the first silencer panel and extending orthogonal to the flow direction of the fluid; and (iii) a fourth longitudinal surface adjoining the second lateral surface of the first silencer panel and extending parallel to the third longitudinal surface of the first silencer panel;

the second silencer panel comprises:

a first side including: (i) a first longitudinal surface extending parallel to the flow direction of the fluid and being configured to come into contact with the fluid; (ii) a first lateral surface adjoining the first longitudinal surface of the second silencer panel and extending orthogonal to the flow direction of the fluid; (iii) a second longitudinal surface adjoining the first lateral surface of the second silencer panel and extending parallel to the first longitudinal surface of the second silencer panel, (iv) a second lateral surface adjoining the second longitudinal surface of the second silencer panel and extending orthogonal to the flow direction of the fluid and parallel to the first lateral surface of the second silencer panel; and (v) a third longitudinal surface adjoining the second lateral surface of the second silencer panel and extending parallel to the second longitudinal surface of the second silencer panel; and a second side including: (i) a fourth longitudinal surface extending parallel to the flow direction of the fluid and being configured to come into contact with the fluid; (ii) a third lateral surface adjoining the fourth longitudinal surface of the second silencer panel and extending orthogonal to the flow direction of the fluid; (iii) a fifth longitudinal surface adjoining the third lateral surface of the second silencer panel and extending parallel to the fourth longitudinal surface of the second silencer panel; (iv) a fourth lateral surface adjoining the fifth longitudinal surface of the second silencer panel and extending orthogonal to the flow direction of the fluid and parallel to the third lateral surface of the second silencer panel; and (v) a sixth longitudinal surface adjoining the fourth lateral surface of the second silencer panel and extending parallel to the fifth longitudinal surface of the second silencer panel;

the first lateral surface of the second silencer panel, the second longitudinal surface of the second silencer panel, the second lateral surface of the second silencer panel, the third lateral surface of the second silencer panel, the fifth longitudinal surface of the second silencer panel, and the fourth lateral surface of the second silencer panel define a stepped part in a fitting side of the second silencer panel facing the first silencer panel; and the first silencer panel and the second silencer panel are linked by the stepped part of the second silencer panel being fitted inside the opening of the first silencer panel such that: (i) the first lateral surface of the first silencer panel abuts the first lateral surface of the second silencer panel; (ii) the second longitudinal surface of the first silencer panel abuts the second longitudinal surface of the second silencer panel; (iii) the second lateral surface of the first silencer panel abuts the third lateral surface of the second silencer panel; (iv) the fourth longitudinal surface of the first silencer panel abuts the fifth longitudinal surface of the second silencer panel; and (v) a hollow portion extends orthogonal to the flow direction of the fluid from the third longitudinal surface of the second silencer panel to the sixth longitudinal surface of the second silencer panel so as to connect a central portion of the opening of the first silencer panel with an opening of the second silencer panel.

3. The gas turbine silencer according to claim 2, wherein:
the first longitudinal surface of the first silencer panel and the first longitudinal surface of the second silencer panel are flush; and
the third longitudinal surface of the first silencer panel and the fourth longitudinal surface of the second silencer panel are flush.

4. The gas turbine silencer according to claim 2, wherein the stepped part is one of a plurality of stepped parts in the second silencer panel.

5. The gas turbine silencer according to claim 2, wherein:
each of the plurality of plate-shaped divided silencer panels defines a hollow box;
at least one of the first longitudinal surface of the first silencer panel, the third longitudinal surface of the first silencer panel, the first longitudinal surface of the second silencer panel or the fourth longitudinal surface of the second silencer panel comprises a plurality of holes; and
the hollow box of each of the plurality of plate-shaped divided silencer panels contains a sound-absorbing material.

6. A gas turbine comprising:
a compressor configured to compress air from an air intake port;
a combustor configured to generate combustion gas by supplying fuel to compressed air compressed by the compressor, and igniting and combusting the fuel with the compressed air;
a turbine section configured to generate rotational force in a rotor using the combustion gas;
an exhaust chamber configured to discharge the combustion gas in the turbine section to outside; and
a gas turbine silencer positioned between the air intake port and the compressor, the gas turbine silencer comprising:

a plurality of plate-shaped divided silencer panels aligned at predetermined intervals orthogonal to a flow direction of a fluid between the air intake port and the compressor;
wherein:
each of the plurality of plate-shaped divided silencer panels comprises an upstream silencer panel and a downstream silencer panel, the upstream silencer panel being positioned on an upstream side, with respect to the flow direction of the fluid, of the downstream silencer panel,
and the downstream silencer panel being linked with the upstream silencer panel;
an opening is defined in a first silencer panel, the first silencer panel being one of the upstream silencer panel or the downstream silencer panel, the opening being defined on an opening side of the first silencer panel facing a second silencer panel, the second silencer panel being the other of the upstream silencer panel or the downstream silencer panel;
the first silencer panel comprises:
a first side including: (i) a first longitudinal surface extending parallel to the flow direction of the fluid and being configured to come into contact with the fluid; (ii) a first lateral surface adjoining the first longitudinal surface of the first silencer panel and extending orthogonal to the flow direction of the fluid; and (iii) a second longitudinal surface adjoining the first lateral surface of the first silencer panel and extending parallel to the first longitudinal surface of the first silencer panel; and
a second side including: (i) a third longitudinal surface extending parallel to the flow direction of the fluid and being configured to come into contact with the fluid; (ii) a second lateral surface adjoining the third longitudinal surface of the first silencer panel and extending orthogonal to the flow direction of the fluid; and (iii) a fourth longitudinal surface adjoining the second lateral surface of the first silencer panel and extending parallel to the third longitudinal surface of the first silencer panel;
the second silencer panel comprises:
a first side including: (i) a first longitudinal surface extending parallel to the flow direction of the fluid and being configured to come into contact with the fluid; (ii) a first lateral surface adjoining the first longitudinal surface of the second silencer panel and extending orthogonal to the flow direction of the fluid; (iii) a second longitudinal surface adjoining the first lateral surface of the second silencer panel and extending parallel to the first longitudinal surface of the second silencer panel; (iv) a second lateral surface adjoining the second longitudinal surface of the second silencer panel and extending orthogonal to the flow direction of the fluid and parallel to the first lateral surface of the second silencer panel; and (v) a third longitudinal surface adjoining the second lateral surface of the second silencer panel and extending parallel to the second longitudinal surface of the second silencer panel; and
a second side including: (i) a fourth longitudinal surface extending parallel to the flow direction of the fluid and being configured to come into contact with the fluid; (ii) a third lateral surface adjoining the fourth longitudinal surface of the second silencer panel and extending orthogonal to the flow direction of the fluid; (iii) a fifth longitudinal surface adjoining the third lateral surface of the second silencer panel and extending parallel to the fourth longitudinal surface of the second silencer panel; (iv) a fourth lateral surface adjoining the fifth longitudinal surface of the second silencer panel and extending orthogonal to the flow direction of the fluid and parallel to the third lateral surface of the second silencer panel; and (v) a sixth longitudinal surface adjoining the fourth lateral surface of the second silencer panel and extending parallel to the fifth longitudinal surface of the second silencer panel;

the first lateral surface of the second silencer panel, the second longitudinal surface of the second silencer panel, the second lateral surface of the second silencer panel, the third lateral surface of the second silencer panel, the fifth longitudinal surface of the second silencer panel, and the fourth lateral surface of the second silencer panel define a stepped part in a fitting side of the second silencer panel facing the first silencer panel; and the first silencer panel and the second silencer panel are linked by the stepped part of the second silencer panel being fitted inside the opening of the first silencer panel such that: (i) the first lateral surface of the first silencer panel abuts the first lateral surface of the second silencer panel; (ii) the second longitudinal surface of the first silencer panel abuts the second longitudinal surface of the second silencer panel; (iii) the second lateral surface of the first silencer panel abuts the third lateral surface of the second silencer panel; (iv) the fourth longitudinal surface of the first silencer panel abuts the fifth longitudinal surface of the second silencer panel; and (v) a hollow portion extends orthogonal to the flow direction of the fluid from the third longitudinal surface of the second silencer panel to the sixth longitudinal surface of the second silencer panel so as to connect a central portion of the opening of the first silencer panel with an opening of the second silencer panel.

7. The gas turbine according to claim 6, wherein:
the first longitudinal surface of the first silencer panel and the first longitudinal surface of the second silencer panel are flush; and
the third longitudinal surface of the first silencer panel and the fourth longitudinal surface of the second silencer panel are flush.

8. The gas turbine according to claim 6, wherein the stepped part is one of a plurality of stepped parts in the second silencer panel.

9. The gas turbine according to claim 6, wherein:
each of the plurality of plate-shaped divided silencer panels defines a hollow box;
at least one of the first longitudinal surface of the first silencer panel, the third longitudinal surface of the first silencer panel, the first longitudinal surface of the second silencer panel or the fourth longitudinal surface of the second silencer panel comprises a plurality of holes; and
the hollow box of each of the plurality of plate-shaped divided silencer panels contains a sound-absorbing material.

\* \* \* \* \*